US007873596B2

(12) United States Patent
Pudipeddi et al.

(10) Patent No.: US 7,873,596 B2
(45) Date of Patent: Jan. 18, 2011

(54) EXTENDING CLUSTER ALLOCATIONS IN AN EXTENSIBLE FILE SYSTEM

(75) Inventors: Ravisankar V. Pudipeddi, Bellevue, WA (US); Vishal V. Ghotge, Seattle, WA (US); Sarosh C. Havewala, Kirkland, WA (US); Ravinder S. Thind, Kirkland, WA (US); Mark J. Zbikowski, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 309 days.

(21) Appl. No.: 11/752,872

(22) Filed: May 23, 2007

(65) Prior Publication Data

US 2008/0091702 A1 Apr. 17, 2008

Related U.S. Application Data

(60) Provisional application No. 60/802,922, filed on May 23, 2006.

(51) Int. Cl.
*G06F 17/00* (2006.01)

(52) U.S. Cl. ........................ 707/610; 707/614; 707/620

(58) Field of Classification Search ................. 707/610, 707/614, 620
See application file for complete search history.

(56) References Cited

U.S. PATENT DOCUMENTS 4,780,821 A 10/1988 Crossley
4,987,531 A 1/1991 Nishikado
5,083,264 A 1/1992 Platteter
5,202,982 A 4/1993 Gramlich et al.
5,307,494 A 4/1994 Yasumatsu
5,313,646 A 5/1994 Hendricks
5,359,725 A 10/1994 Garcia
5,363,487 A 11/1994 Willman
5,367,671 A 11/1994 Feigenbaum
5,371,885 A 12/1994 Letwin
5,388,257 A 2/1995 Bauer
5,392,427 A 2/1995 Barrett
5,412,808 A 5/1995 Bauer
5,421,001 A 5/1995 Methe
5,434,974 A 7/1995 Loucks
5,437,029 A 7/1995 Sinha
5,483,652 A 1/1996 Sudama
5,535,375 A 7/1996 Eshel
5,579,517 A 11/1996 Reynolds (Continued)

FOREIGN PATENT DOCUMENTS

EP 0462587 A2 12/1991

(Continued)

OTHER PUBLICATIONS

Karpovich, John F. et al.; "ExtensibLe File Systems (ELFS): An Object-Oriented Approach to High Performance File I/O"; 1994; pp. 191-204.

(Continued)

*Primary Examiner*—Sana Al-Hashemi

(57) ABSTRACT

An extensible file system format for portable storage media is provided. The extensible file system format includes the specification of primary and secondary directory entry types that may be custom defined. The primary and secondary directory entry types can be further classified as critical and benign directory entries. The directory entry types can define whether a cluster chain corresponding to a file can be contiguously allocated.

12 Claims, 8 Drawing Sheets

| NAME | SIZE |
|---|---|
| IN USE | 1:1 |
| TYPE | 1:7 |
| SECONDARY ENTRIES | 1 |
| GUID | 16 |
| ALLOCATION FLAG | 1 |
| OTHER | X |

800, 802, 804, 806, 808, 810, 812

START CLUSTER EXTENSION ROUTINE (1100)
OBTAIN REQUEST FOR CLUSTER EXTENSION (1102)
CAN CLUSTER ALLOCATION BY CONTIGUOUS ? (1104)
PROCESS NON-CONTIGUOUS CLUSTER ALLOCATION (FIG. 12) (1106)
UPDATE SIZE OF ALLOCATED CLUSTERS IN FILE ALLOCATION TABLE (1108)
END (1110)

U.S. PATENT DOCUMENTS

| | | | | |
|---|---|---|---|---|
| 5,596,755 | A | 1/1997 | Pletcher | |
| 5,627,996 | A | 5/1997 | Bauer | |
| 5,694,606 | A | 12/1997 | Pletcher | |
| 5,745,752 | A | 4/1998 | Hurvig | |
| 5,745,902 | A | 4/1998 | Miller | |
| 5,754,848 | A | 5/1998 | Hanes | |
| 5,758,352 | A | 5/1998 | Reynolds | |
| 5,761,675 | A | 6/1998 | Isenberg | |
| 5,761,677 | A | 6/1998 | Senator | |
| 5,765,169 | A | 6/1998 | Conner | |
| 5,819,275 | A | 10/1998 | Badger | |
| 5,898,868 | A | 4/1999 | Krueger | |
| 5,923,884 | A | 7/1999 | Peyret et al. | |
| 5,926,805 | A | 7/1999 | Hurvig | |
| 6,055,527 | A | 4/2000 | Badger | |
| 6,205,558 | B1 | 3/2001 | Sobel | |
| 6,374,265 | B1 | 4/2002 | Chen | |
| 6,615,365 | B1 * | 9/2003 | Jenevein et al. | 714/6 |
| 7,072,917 | B2 | 7/2006 | Wong et al. | |
| 7,383,288 | B2 | 6/2008 | Miloushev et al. | |
| 7,620,620 | B1 | 11/2009 | Sedlar | |
| 7,676,491 | B2 | 3/2010 | Jansen et al. | |
| 2003/0088587 | A1 | 5/2003 | Merrells et al. | |
| 2004/0215600 | A1 | 10/2004 | Aridor | |
| 2005/0015354 | A1 | 1/2005 | Grubbs et al. | |

FOREIGN PATENT DOCUMENTS

| | | | |
|---|---|---|---|
| EP | 0618540 | A2 | 10/1994 |
| JP | 64-041039 | A | 2/1989 |
| JP | 01-315843 | A | 12/1989 |
| JP | 02-148341 | A | 6/1990 |
| JP | 03-017753 | A | 1/1991 |
| JP | 04-188239 | A | 7/1992 |
| JP | 60-19763 | A | 1/1994 |

OTHER PUBLICATIONS

"Long Filenames"; Windows 95 Beta 2 Release SDK; Article 15; Oct. 28, 1994; pp. 19-47.

"Above Software Introduces 'Golden Retriever 2.0b'," News Release, Dateline: Irvine, California, Mar. 29, 1993.

Bonner, P., "What's in a Name?" PC/Computing 2(9):169(2), Sep. 1989.

Bonner, P., "Build a Document Manager Under Windows," PC/Computing 4(12):275(7), Dec. 1991.

Duncan, R., "Design Goals and Implementation of the New High Performance File System," Microsoft Systems Journal 4(5):1-13, Sep. 1989.

Duncan, R., "Power Programming Using Long Filenames and Extended Attributes, Part I," PC Magazine 9(8):317-322, Apr. 24, 1990.

Duncan, R., "Power Programming Using Long Filenames and Extended Attributes, Part II," PC Magazine 9(9):305-310, May 15, 1990.

"File Sharing Protocol," Microsoft Corporation, Nov. 7, 1988.

Glass, B., "Create Your Own Environment," PC-Computing 3(10):106-110, Oct. 1990.

Hurwicz, M., "MS-DOS 3.1 Makes It Easy to Use IBM PCs on a Network," Data Communications, Nov. 1985, pp. 223-237.

"The Intelligent Way to Search," News Release, Dateline: Burlington, Massachusetts, Oct. 1987.

Leffler, S.J., et al., "The Design and Implementation of the 4.3BSD UNIX Operating System," Addison-Wesley Publishing Company, New York, 1989, Chap. 2, "Design Overview of 4.3BSD," pp. 34-36.

Mallory, J., "Breakthrough on DOS Filename Limits," Newsbytes News Network, Apr. 12, 1993, <http://calbears.findarticles.com/p/articles/mi_m0NEW/is_1993_April_12/ai_13786607/print> [retrieved May 24, 2006].

McCormick, J., "Presentation Manager Under OS/2 Encourages Lengthy Name-Calling," Goverment Computer News 9(10):16, 18, May 14, 1990.

Lent, A.F., and S. Miastkowski, "New, Improved Windows," PC World 11(12):252(17), Dec. 1993.

O'Malley, C., "Fetching Desktop Files: Standalone Document Managers," Window Sources 1(2):443-444, Mar. 1993.

Rohan, R., "Golden Retriever Fetches Files in Windows," Computer Shopper 12(11):947, Nov. 1992.

Tanenbaum, A.S. (ed.), MINIX OPERATION SYSTEM, Keiichiro Sakamoto, Tokyo, Japan, 1989, Chap. 5, "File System," pp. 310-313 (English translation of Japanese publication).

Trivette, D.B., "Utility Provides 60-Character Filenames," PC Magazine 7(16):56, Sep. 27, 1988.

Wang, Y.E.G., "Universal_File_Names for Ada," Ada Letters 10(1):111-117, Jan./Feb. 1990.

"World Software Corporation (WSC) Launches Extend-a-name in Europe," Computer Product Update, Jul. 27, 1990.

Tanenbaum, A.S.; "Modern Operating Systems"; 2nd ed.; Prentice Hall, Englewood Cliffs, NJ; 2001; pp. 442-445.

Russian Office Action issued Dec. 14, 2009 citing the Russian counterpart (RU 2159467) of the above-referenced U.S. Patent 5,923,884 to Peyret et al.

* cited by examiner

| NAME | SIZE | |
|---|---|---|
| OEM NAME | 3 | 402 |
| DATA SIZE DESCRIPTORS | X | 404 |
| ACTIVE FAT | 2 | 406 |
| VOLUME SERIAL NUMBER | 4 | 408 |
| FILE SYSTEM TYPE | X | 410 |

| NAME | SIZE | |
|---|---|---|
| IN USE | 1:1 | 602 |
| TYPE | 1:7 | 604 |
| CHARACTERS | 1 | 606 |
| NAME HASH | 2 | 608 |
| FILE NAME | 28 | 610 |

| NAME | SIZE | |
|---|---|---|
| IN USE | 1:1 | 502 |
| TYPE | 1:7 | 504 |
| SECONDARY ENTRIES | 1 | 506 |
| ATTRIBUTES | 2 | 508 |
| TIME | X | 510 |
| TIME ZONE | 1 | 512 |

| NAME | SIZE | |
|---|---|---|
| IN USE | 1:1 | 702 |
| TYPE | 1:7 | 704 |
| SECONDARY ENTRIES | 1 | 706 |
| GUID | 16 | 708 |

| NAME | SIZE |
|---|---|
| IN USE | 1:1 |
| TYPE | 1:7 |
| SECONDARY ENTRIES | 1 |
| GUID | 16 |
| ALLOCATION FLAG | 1 |
| OTHER | X |

| NAME | SIZE |
|---|---|
| IN USE | 1:1 |
| TYPE | 1:7 |
| SECONDARY | 16 |
| GUID | 16 |
| ALLOCATION FLAG | 1 |
| OTHER | X |

| NAME | SIZE |
|---|---|
| IN USE | 1:1 |
| TYPE | 1:7 |
| ACL INFORMATION | X |

EXTENDING CLUSTER ALLOCATIONS IN AN EXTENSIBLE FILE SYSTEM

CROSS-REFERENCE TO RELATED APPLICATION

This application claims the benefit of U.S. Provisional Application No. 60/802,922, entitled Naming Protocol for Extensible File System, filed May 23, 2006, and is incorporated herein by reference.

BACKGROUND

Generally described, there are a number of portable computing devices, such as digital still cameras, digital video cameras, media players, mobile phones, mobile computing devices, personal digital assistants, and the like that maintain data on a storage media, such as a portable storage media. The continued development of more complex portable computing devices and larger storage capacity portable storage media places a greater demand for flexibility on the file system format used on the storage media. Current file system format approaches can become deficient in that they do not provide adequate flexibility for increasing storage size capacities and/or storage media applications.

In one embodiment, extensible file systems may be utilized in these embodiments to allow for increased storage size capacities and application to storage media application. In one embodiment of an extensible file system, data made be stored in allocated clusters within a file system. As the amount of data increases, the number of allocated clusters may also increase. Accordingly, in these embodiments, each new allocated cluster would likely be added as a new entry in the file system, such as an additional entry in a file allocation table. The additional allocation and management of each separate cluster in an allocation can become inefficient for file system management.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An extensible file system format for portable storage media is provided. The extensible file system format includes the specification of primary and secondary directory entry types that may be custom defined. The primary and secondary directory entry types can be further classified as critical and benign directory entries. The directory entry types can define whether a cluster chain corresponding to a file can be contiguously allocated.

A computer-readable medium having computer-executable components for storing data is provided. The components include a boot parameters component for specifying boot parameters for a file system. The components also include a file allocation table component for defining a file allocation table associated with the file system. The components further include two or more primary directory entry components for specifying data in a root directory of the file system. At least one primary directory entry component includes a flag corresponding to an indication of a contiguous cluster chain. Finally, the components include at least one secondary entry component corresponding to the primary directory entry component and defining meta data associated with the primary directory entry component.

In accordance with another aspect, a method for managing data organized into a plurality of clusters is provided. In accordance with the method, a request for an extension of a plurality of clusters is obtained. A determination is made whether the set of clusters can be contiguously allocated. If the set of clusters can be contiguously allocated, a cluster chain size allocation is updated in accordance with the size of the request for the extension. If the set of clusters cannot be contiguously allocated, entries are made in the file allocation table for each cluster in the cluster chain.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

The foregoing aspects and many of the attendant advantages of this invention will become more readily appreciated as the same become better understood by reference to the following detailed description, when taken in conjunction with the accompanying drawings, wherein:

FIG. 4 is a block diagram illustrative of data components for implementing a boot process block in an extensible file system format in accordance with an aspect of the present invention;

FIG. 5 is a block diagram illustrative of data components for implementing directory entries in an extensible file system format in accordance with an aspect of the present invention FIG. 6 is a block diagram illustrative of data components for implementing a file name and extensions in an extensible file system format in accordance with an aspect of the present invention;

FIG. 7 is a block diagram illustrative of data components for implementing a volume identifier in an extensible file system format in accordance with an aspect of the present invention;

FIG. 8 is a block diagram illustrative of data components for implementing an extensible directory entry in an extensible file system format in accordance with an aspect of the present invention;

FIG. 9 is a block diagram illustrative of data components for implementing an extensible directory entry in an extensible file system format in accordance with an aspect of the present invention;

FIG. 10 is a block diagram illustrative of data components for implementing an access control list in an extensible file system format in accordance with an aspect of the present invention;

DETAILED DESCRIPTION

Generally described, the present invention relates to an extensible file system format and various processes associated with the extensible file system format. In an illustrative embodiment, the extensible file system format corresponds to an extensible file system format for portable storage media and various processes associated with the extensible file system format on the portable storage media. More specifically, in an embodiment, processes and data structures are provided for facilitating the storage and management of file data in contiguous data clusters. Although the present invention will be described with regard to a portable storage media file system format, one skilled in the relevant art will appreciate that the disclosed embodiments are illustrative in nature and should not be construed as limiting. Additionally, one skilled in the relevant art will appreciate that the data structures and data layouts used in the illustrative examples may require additional information related to performance, security, and the like.

Figure 1A:
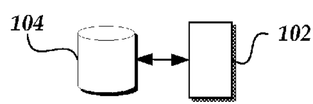
FIGS. 1A-1C are block diagrams illustrative of an illustrative environment including a portable computing device and a storage device implementing the extensible file system format in accordance with an aspect of the present invention.
Figure 1C:
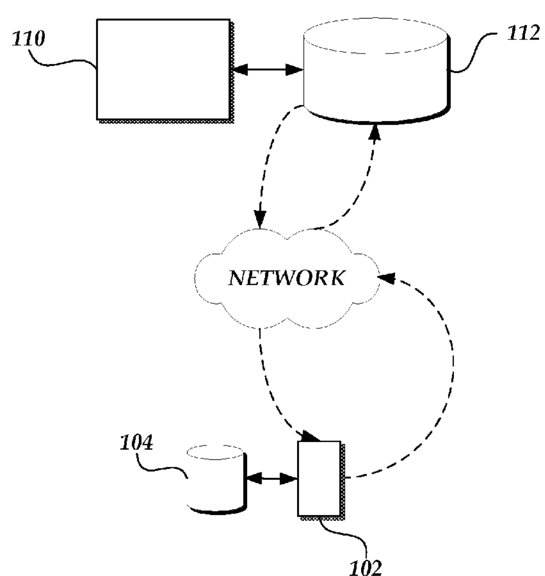
Figure 1B:
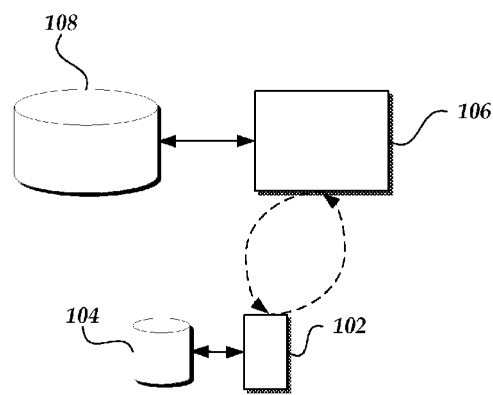

FIGS. 1A-1C are block diagrams illustrative of various operating environments 100 for the extensible file system format of the present invention. With reference to FIG. 1A, in an illustrative embodiment, the extensible file system format is utilized to store data from a computing device, such as a mobile computing device 102, and a storage media, such as a portable storage media 104. In an illustrative embodiment, the mobile computing device 102 can correspond to any one of a variety of computing devices, including but not limited to, portable computing devices, mobile telephones, personal digital assistants, music players, media players. The portable storage media can also include, but is not limited to, hard drives, flash media, micro-drives and other storage media. In an illustrative embodiment, the extensible file system on the portable storage media 104 does not have to include any type of executable or readable software components, such as an operating environment, utilized by the mobile computing device 102. Alternatively, the extensible file system on the portable storage media 104 may include executable or readable software components used by the mobile device 102.

In an illustrative embodiment, the mobile computing device 102 may be in communication with other computing devices for collecting/exchanging data to be stored on the portable storage media 104. With reference to FIG. 1B, the mobile computing device 102 may be in direct communication with another computing device 106 and storage media 108. In an illustrative embodiment, the direct communication can correspond to various wired and wireless communication methods. In an illustrative embodiment, the other storage media 108 is not required to be formatted in accordance with the extensible file system format of the present invention. With reference to FIG. 1C, in a similar manner, the mobile computing device 102 may also be in communication with another computing device 110 and storage media 112, via a network connection. In an illustrative embodiment, the network connection can correspond to local area network (LAN) and wide are network (WAN) connections.

Figure 2:
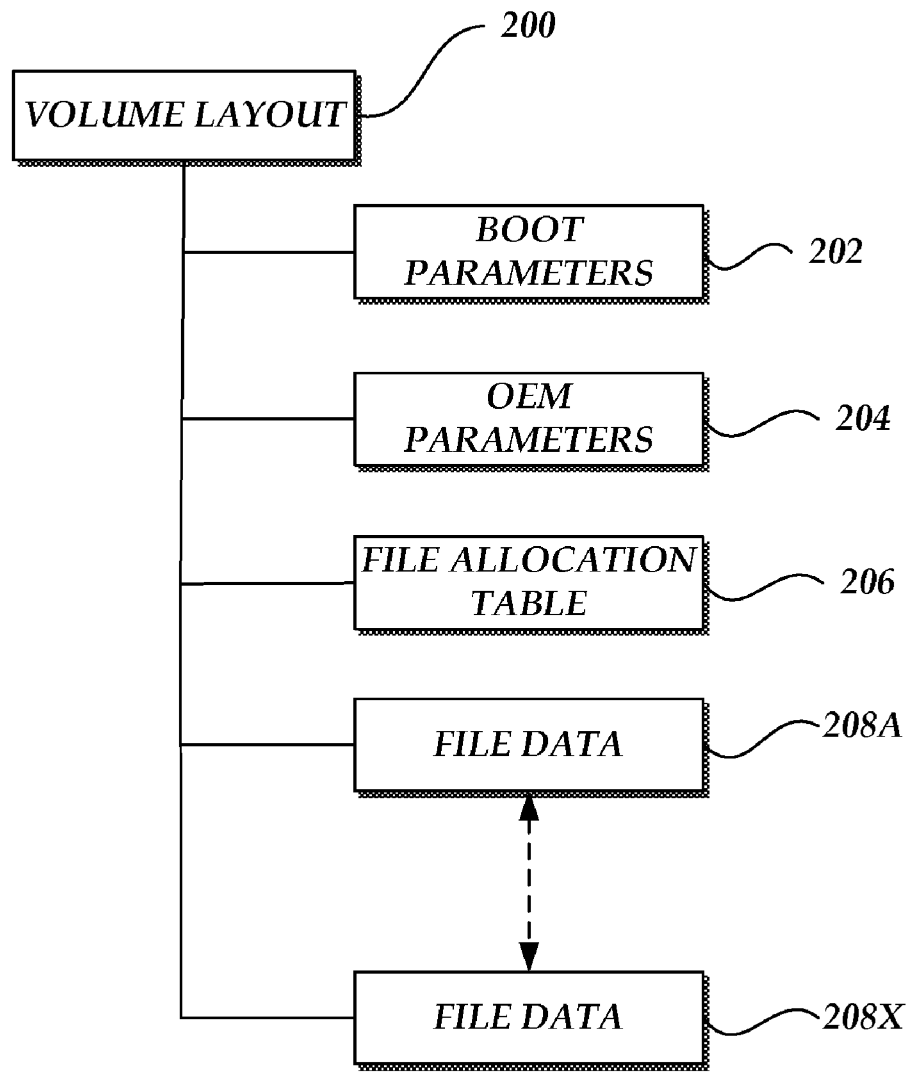
FIG. 2 is a block diagram illustrative of various volume layout components corresponding to an extensible file system format in accordance with an aspect of the present invention.

With reference now to FIG. 2, an illustrative embodiment volume layout 200 for an extensible file system format will be described. The volume layout 200 includes a boot parameters component 202 that include various information related to a description of the file system parameters of the partition. In an illustrative embodiment, the boot parameters component 202 can include code for bootstrapping from a defined partition, fundamental file system parameters for the defined partition, and various error checking information. A data structure for defining at least a portion of the boot parameters will be described below with regard to FIG. 4.

The volume layout 200 also includes an extensible parameters component, designated as OEM parameters 204, that define various additional data structures used in conjunction with the file system. In an illustrative embodiment, an original equipment manufacture (OEM) may specify various extensible data structures, such as performance parameters for a storage medium, that can be defined at time of manufacture. The volume layout 200 can further include a file allocation table component 206 that defines file and directory allocations. In an illustrative embodiment, each entry in the file allocation table component 206 corresponds to a 32-bit entry that represents an allocated cluster, an unallocated cluster or an unusable cluster. As will be explained in greater detail below, in an illustrative embodiment, contiguously allocated clusters will not require a separate entry for each allocated cluster in the file allocation table component 206. The volume layout 200 can still further include series of file data components 208A-208X that correspond to the data stored according to the file system format. Various data structures for defining a portion of the file data components 208A-208X will be defined with regard to FIGS. 3-10.

Figure 3:
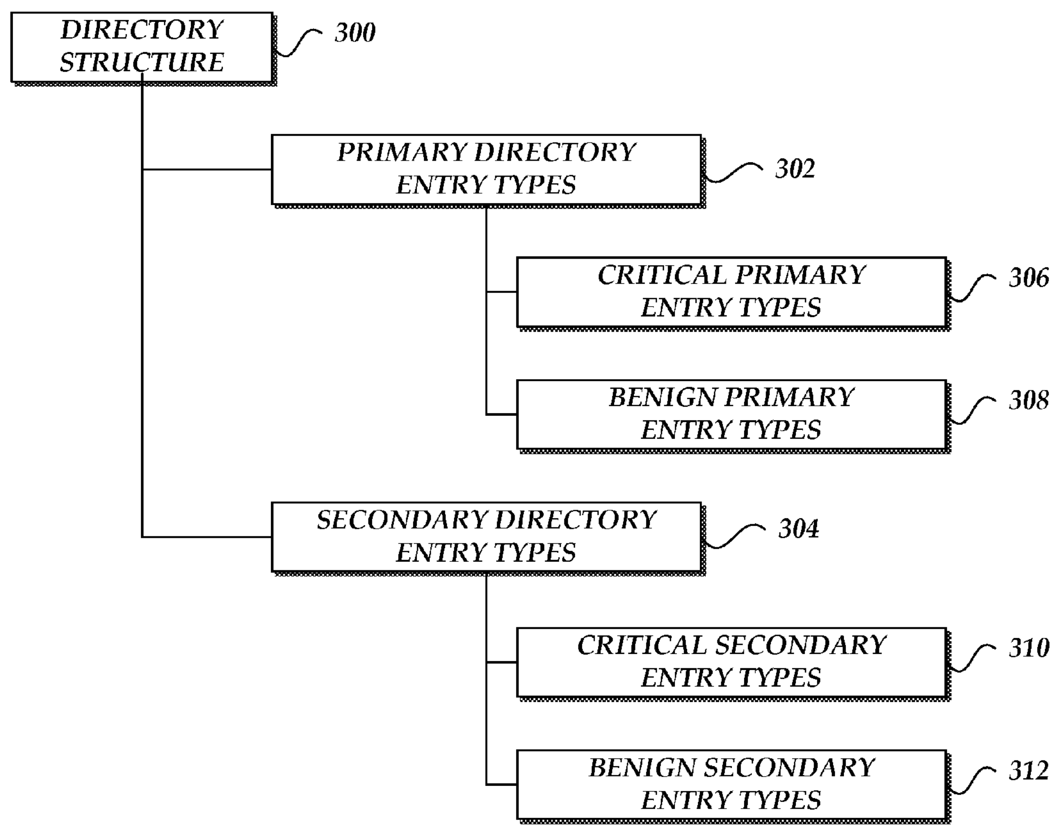
FIG. 3 is a block diagram illustrative of an extensible file system directory structures including primary and secondary directory entry structures in accordance with an aspect of the present invention.

Turning now to FIG. 3, in one aspect, the file data components 208 may include one or more directory entries according to a directory structure 300. In an illustrative embodiment, the directory structure 300 is organized into primary directory entries 302 and secondary directory entries 304. Each directory entry in the primary and secondary entries is typed. For example, in an illustrative embodiment, type values for the primary and secondary directory entries can correspond to a range of 1-255. Primary directory entries 302 correspond to the entries in the root directory of the file system. Secondary directory entries 304 follow a primary directory entry and are associated with the primary directory entry. Secondary directory entries extend the metadata associated with the correlated primary directory entry.

With continued reference to FIG. 3, in an illustrative embodiment, the primary directory entries 302 can be further classified as critical primary directory entries 306 and benign primary directory entries 308. Critical primary directory entries 306 define potentially different formats for each directory entry. In an illustrative embodiment, an operating environment will not mount a volume corresponding to the extensible file system format with an unknown critical primary directory entry, as will be described below. Examples of known primary directory entries 306 can include allocation bitmaps, up-case tables, volume labels, encryption keys, and normal directory entries. Benign primary directory entries 308 also define potential different formats for each directory entry, but can be ignored by the file system if a particular benign primary directory entry is not understood. Benign primary directory entries 308 can be associated with another cluster chain the volume and can be contiguously allocated. For example, a contiguously allocated benign primary directory entry can be identified through the setting of a corresponding flag. Additionally, benign primary directory entries 308 can also be associated a number of secondary directory entries 304.

In a manner similar to primary directory entries 302, secondary directory entries 304 may also be further classified as critical secondary directory entries 310 and benign secondary directory entries 312. As described above, the critical secondary directory entries 310 and benign secondary directory entries 312 are associated with a benign primary directory entry and extend the metadata associated with the primary directory entry. Both the critical secondary directory entries 310 and the benign secondary directory entries 312 can be associated with another cluster chain in the volume and can be contiguously allocated.

To mount a corresponding to the extensible file system format, the file system implements a mount volume procedure. In an illustrative embodiment, the mount volume procedure attempts to a look at a version number for the volume. If the version number is not understood (e.g., the version number is higher), the volume will not be mounted. During a normal directory enumeration, any critical primary directory entries not known by the file system will prevent the volume from being mounted. Thereafter, various user-initiated processes, such as a file open, will cause the file system to enumerate the secondary directory entries. If the critical secondary directory entries 310 are not known by a file system, the entire directory entry will be skipped. Additionally, if benign secondary directory entries 312 are not known by the file system, the particular unknown benign secondary directory entry will be ignored.

With reference now to FIG. 4, a block diagram illustrative of data components 400 for implementing a boot process block in the boot parameters component 202 (FIG. 2) will be described. The data components 400 include an OEM name component 402 for specifying a name for the file system format of the storage media. The data components 400 also include a data size descriptor component 404 for specifying various characteristics of the data stored in the file system. For example, the data size descriptor component 404 can specify a count of bytes per sector, a number of sectors per allocation unit, a file allocation table ("FAT") table offset, and a count of sectors for all data structures. The data components include an active FAT flags component 406 for specifying a number of active FATs on the file system. In an illustrative embodiment, a file system may support multiple FATs for utilization with some operating system environments. The data components 400 can further include a volume identification component 408 for identifying a volume serial number and/or version number. Still further, the data components 400 can include a file system type for specifying the file system format for the file system. One skilled in the relevant art will appreciate that the data components 400 can include a number of additional/alternative rows for implementing the above-identified components 402-410 and additional components.

Turning now to FIG. 5, a block diagram illustrative of data components 500 for implementing directory entries in an extensible file system format will be described. Turning now to FIG. 6, a block diagram data components 500 for implementing a file name and extensions will be described. The data components 500 include an in use component 502 for specifying whether the particular directory entry is in use. In an illustrative embodiment, the high bit of the data components will be set to "1" if the directory entry is in use. The data components 500 further include a type designation component 504 for specifying that the directory entry is associated with a normal directory entry. The data components 500 further include a secondary directory entries component 504 for specifying a number of secondary entries associated with the normal directory entry. The data components 500 also include a file attributes component 508 for specifying various file system attributes for the directory entry. Still further, the data components 500 include a time component 510 for specifying various time information such as a creation timestamp, modification time stamp and other time information. Additionally, the data components 500 further include a time zone component 512 for specifying a time zone for the last created time stamp. One skilled in the relevant art will appreciate that the data components 500 can include a number of additional/alternative rows for implementing the above-identified components 502-512 and additional components.

Turning now to FIG. 6, a block diagram data components 600 for implementing a file name and extensions will be described. The data components 600 include an in use component 602 for specifying whether the particular directory entry is in use. In an illustrative embodiment, the high bit of the data components will be set to "1" if the directory entry is in use. The data components 600 further include a type designation component 604 for specifying that the directory entry is associated with a file system name. The data components further include a file name length component 606 and a file name has component 608. The utilization of the file name hash component 608 will be described below. The data components 600 also include a file name component 610 for specifying the file name. One skilled in the relevant art will appreciate that the data components 600 can include a number of additional/alternative rows for implementing the above-identified components 602-610 and additional components. Additionally, file name directory entries may be extended by secondary directory entries.

Turning now to FIG. 7, a block diagram illustrative of data components 700 for implementing a volume identifier in an extensible file system format is provided. The data components 700 include an in use component 702 for specifying whether the particular directory entry is in use. In an illustrative embodiment, the high bit of the data components will be set to "1" if the directory entry is in use. The data components 700 further include a type designation component 704 for specifying that the directory entry is associated with a volume identifier. The data components 700 further include a secondary directory entries component 706 for specifying a number of secondary entries associated with the volume identifier. The data components 700 also include a volume identifier 708, such as a global unique identifier. One skilled in the relevant art will appreciate that the data components 700 can include a number of additional/alternative rows for implementing the above-identified components 702-708 and additional components. Additionally, in an illustrative embodiment, the data components 700 correspond to a benign directory entry that can be ignored by a file system that does not support volume identifiers.

With reference now to FIGS. 8 and 9, in an illustrative embodiment, parties, such as an OEM, may be able to define specific benign primary directory entry types 308 and benign secondary directory entry types 312. As discussed above, in the event the file system would not recognize or understand either the specific benign primary directory entry types 308 or benign secondary directory entry types 312, the file system could ignore the defined directory entry types.

With reference to FIG. 8, a block diagram illustrative of data components 800 for implementing an extensible benign primary directory entry 308 in an extensible file system format will be described. The data components 800 include an in use component 802 for specifying whether the particular directory entry is in use. In an illustrative embodiment, the high bit of the data components will be set to "1" if the directory entry is in use. The data components 800 further include a type designation component 804 for specifying that the directory entry is a benign primary directory entry. The data components 800 further include a secondary directory entries component 806 for specifying a number of secondary entries associated with the volume identifier. The data components 800 also include a volume identifier 808, such as a global unique identifier. The data components 800 can further include a flag component 810 that corresponds to an indication of whether contiguous allocation of a cluster chain is to be implemented. The data components 800 can still further include additional information 812, such as verification information and a starting cluster. As will be explained in greater detail below, cluster chains utilizing contiguous allocation can be defined according to cluster chain size and a starting cluster for the first cluster in the cluster chain. One skilled in the relevant art will appreciate that the data components 800 can include a number of additional/alternative rows for implementing the above-identified components 802-812 and additional components.

With reference to FIG. 9, a block diagram illustrative of data components 900 for implementing a benign secondary directory entry in an extensible file system format will be described. The data components 900 include an in use component 902 for specifying whether the particular directory entry is in use. In an illustrative embodiment, the high bit of the data components will be set to "1" if the directory entry is in use. The data components 900 further include a type designation component 904 for specifying that the directory entry is a benign primary directory entry. The data components 900 further include a secondary directory entries component 906 for specifying a number of secondary entries associated with the volume identifier. The data components 900 also include a volume identifier 908, such as a global unique identifier. The data components 900 can further include a flag component 910 that corresponds to an indication of whether contiguous allocation of a cluster chain is to be implemented. The data components 900 can further include additional information 912, such as verification information and a starting cluster. One skilled in the relevant art will appreciate that the data components 900 can include a number of additional/alternative rows for implementing the above-identified components 902-912 and additional components.

In an illustrative embodiment, a benign primary directory entry and/or secondary directory entries may be associated with access control list (ACL) information. FIG. 10 is a block diagram illustrative of data components 1000 for implementing an access control list in an extensible file system format. The data components 1000 include an in use component 1002 for specifying whether the particular directory entry is in use. In an illustrative embodiment, the high bit of the data components will be set to "1" if the directory entry is in use. The data components 1000 further include a type designation component 1004 for specifying that the directory entry is an ACL directory entry. The data components 1000 further include a number of ACL fields 1006, such as ACL flags, pointers to ACL databases, and the like. One skilled in the relevant art will appreciate that the data components 1000 can include a number of additional/alternative rows for implementing the above-identified components 1002-1006 and additional components.

In accordance with an aspect of the invention, the utilization of contiguously allocated clusters in a cluster chain mitigates the need for traversing the file allocation table component 206 to identify the clusters in the cluster chain. Because the clusters will be contiguously allocated, each cluster in the chain can be identified with knowledge of the starting location of the first cluster in the chain and the total cluster chain size. For example, assume that each cluster has a size of 4K of data and that the total allocation for a cluster chain is 18 K of data. The cluster chain will require five clusters to capture the data. If the first cluster begins at cluster position 40, then cluster positions 41, 42, 43, and 44 would be taken by the remaining four contiguously allocated clusters in the cluster chain.

Figure 11:
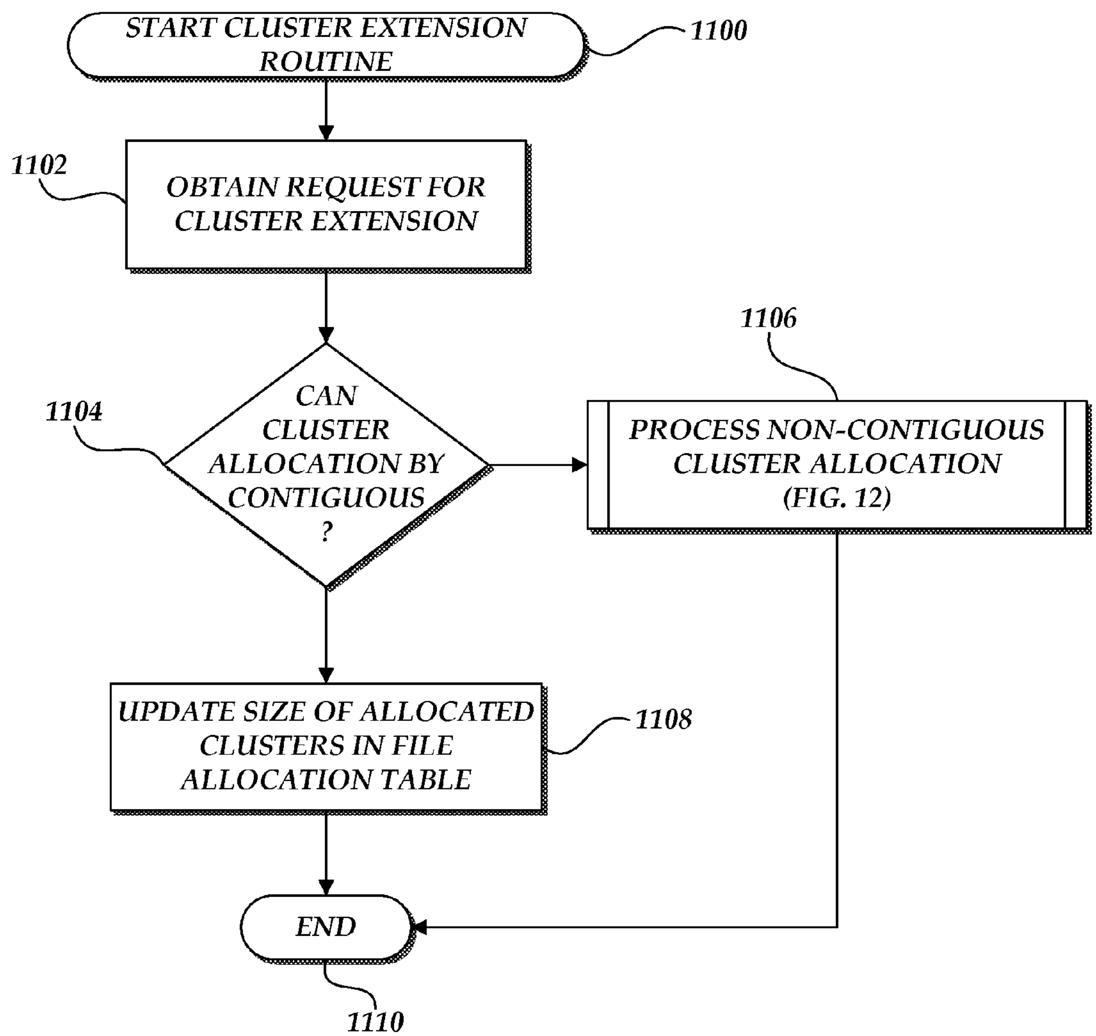
FIG. 11 is a flow diagram illustrative of a cluster chain extension routine for an extensible file system format in accordance with an aspect of the present invention.

In addition to the storage and processing of contiguously allocated clusters, additional processes may be utilized in the extension of a cluster chain. With reference now to FIG. 11, a cluster chain extension routine 1100 for an extensible file system format will be described. At block 1102, a request for extending or modifying the cluster chain is obtained. In an illustrative embodiment, the request for the extension of the cluster chain can correspond to the addition, substitution, modification or rewriting of data.

At decision block 1104, a test is conducted to determine whether the contiguous allocation is available for the cluster chain associated with the request. In an illustrative embodiment, the determination of whether contiguous allocation is available can correspond to a determination of whether the first cluster in the cluster chain includes the contiguous allocation flag set in the flag components (810 or 910). In another embodiment, the determination of whether contiguous allocation is available can correspond to a determination of whether additional contiguous clusters are available. In this embodiment, the last cluster in the cluster chain can be located by identifying the first cluster in the cluster chain and determining the cluster chain size. The determination can check whether contiguous clusters are available, such as by referring to the allocation bitmap.

If contiguous allocation is not available, at block 1106, the entire cluster chain is subject to a noncontiguous allocation. A subroutine for allocating a cluster chain in a noncontiguous manner will be described below with regard to FIG. 12. Alternatively, if contiguous allocation is available, at block 1108, the cluster chain size is updated to reflect the additional cluster. The routine 1100 terminates at block 1110.

Figure 12:
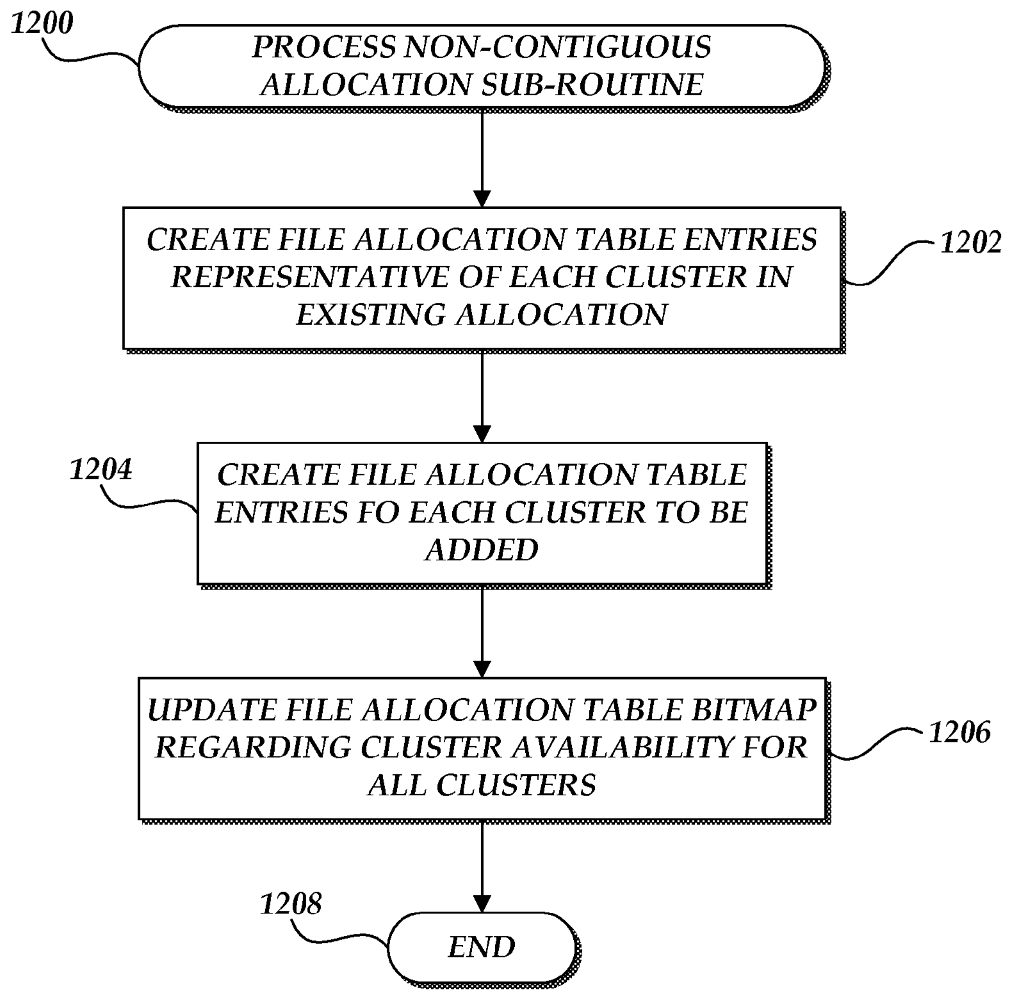
FIG. 12 is a flow diagram of a non-contiguous cluster allocation sub-routine for an extensible file system format in accordance with an aspect of the present invention.

With reference now to FIG. 12, a subroutine for making a noncontiguous allocation of a cluster chain (corresponding to block 1106) will be described. At block 1202, an entry for each existing cluster in the cluster chain is created in the FAT table component 206. Each cluster will also have the flag component 806/906 set to indicate no contiguous allocations. At block 1204, an entry for each cluster to be added will be created in the FAT table component 206. At block 1206, the bitmap allocation will be updated to reflect that allocation of each cluster in the cluster chain. At block 1208, the subroutine returns.

Figure 13:
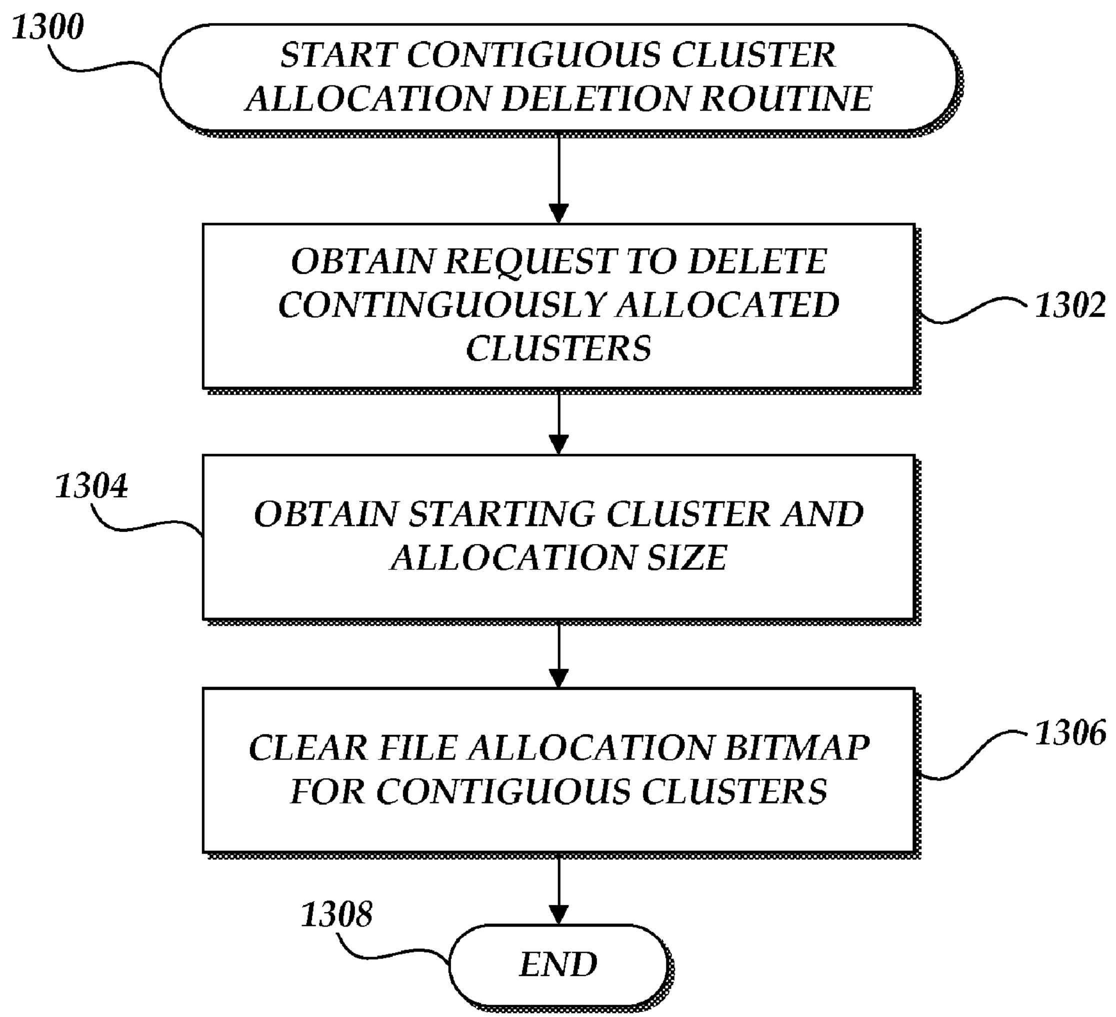
FIG. 13 is a flow diagram of a cluster chain deletion routine for an extensible file system format in accordance with an aspect of the present invention.

With reference now to FIG. 13, a routine 1300 for cluster chain deletion will be described. At block 1302, a request for extending or modifying the cluster chain is obtained. In an illustrative embodiment, the request for the extension of the cluster chain can correspond to the substitution, modification or rewriting of data. At block 1304, the starting cluster associated with the identified cluster chain is identified. Additionally, the allocation size of the cluster chain is also obtained. At block 1306, the FAT allocation bitmap entries for each cluster corresponding to the allocated cluster chain are cleared. At block 1308, the routine 1300 terminates. In an illustrative embodiment, the bitmap entries for each cluster can be cleared without having to traverse the FAT entry for each allocated cluster in the cluster chain.

While illustrative embodiments have been illustrated and described, it will be appreciated that various changes can be made therein without departing from the spirit and scope of the invention.

The invention claimed is:

1. A method comprising:

obtaining a request for an extension of a plurality of clusters, the plurality of clusters comprising a cluster chain having a cluster chain size, the extension of the plurality of clusters comprising an additional allocation of one or more clusters to the cluster chain;

determining whether the extension of the plurality of clusters and the plurality of clusters are contiguously allocatable;

when the extension of the plurality of clusters and the plurality of clusters are contiguously allocatable, allocating the one or more clusters for the extension of the plurality of clusters without allocating a corresponding entry in a file allocation table for the one or more clusters, and updating the cluster chain size of the cluster chain in accordance with the allocation of the one or more clusters for the extension; and when the extension of the plurality of clusters and the plurality of clusters are not contiguously allocatable, allocating an entry in the file allocation table for each of the one or more clusters for the extension.

2. The method as recited in claim 1, further comprising:

updating an allocation bitmap to indicate the allocation of the one or more clusters for the extension.

3. The method as recited in claim 1, wherein determining whether the extension of the plurality of clusters and the plurality of clusters are contiguously allocatable comprises determining whether a contiguous allocation indicium associated with the plurality of clusters indicates that the plurality of clusters is currently contiguously allocated.

4. The method as recited in claim 1, wherein the plurality of clusters has been initially contiguously allocated, and wherein determining whether the extension of the plurality of clusters and the plurality of clusters are contiguously allocatable comprises referring to an allocation bitmap that maintains individual cluster allocation states to determine whether the one or more clusters for the extension are contiguously allocatable with the plurality of clusters.

5. The method as recited in claim 1, wherein determining whether the extension of the plurality of clusters and the plurality of clusters are contiguously allocatable includes determining whether a benign primary directory entry component includes a contiguous allocation indicium associated with the plurality of clusters that indicates whether the plurality of clusters is currently contiguously allocated.

6. The method as recited in claim 1, wherein determining whether the extension of the plurality of clusters and the plurality of clusters are contiguously allocatable includes determining whether a benign secondary directory entry component includes a contiguous allocation indicium associated with the plurality of clusters that indicates whether the plurality of clusters is currently contiguously allocated.

7. A computing device comprising:

one or more storage media comprising computing device executable components that, when executed, configure the computing device to perform operations comprising:

obtaining a request for an extension of a plurality of clusters, the plurality of clusters comprising a cluster chain having a cluster chain size, the extension of the plurality of clusters comprising an additional allocation of one or more clusters to the cluster chain;

determining whether the extension of the plurality of clusters and the plurality of clusters are contiguously allocatable;

when the extension of the plurality of clusters and the plurality of clusters are contiguously allocatable, allocating the one or more clusters for the extension of the plurality of clusters without allocating a corresponding entry in a file allocation table for the one or more clusters, and updating the cluster chain size of the cluster chain in accordance with the allocation of the one or more clusters for the extension; and when the extension of the plurality of clusters and the plurality of clusters are not contiguously allocatable, allocating an entry in the file allocation table for each of the one or more clusters for the extension.

8. The computing device as recited in claim 7, the operations further comprising:

updating an allocation bitmap to indicate the allocation of the one or more clusters for the extension.

9. The computing device as recited in claim 7, wherein determining whether the extension of the plurality of clusters and the plurality of clusters are contiguously allocatable comprises determining whether a contiguous allocation indicium associated with the plurality of clusters indicates that the plurality of clusters is currently contiguously allocated.

10. The computing device as recited in claim 7, wherein the plurality of clusters has been initially contiguously allocated, and wherein determining whether the extension of the plurality of clusters and the plurality of clusters are contiguously allocatable comprises referring to an allocation bitmap that maintains individual cluster allocation states to determine whether the one or more clusters for the extension are contiguously allocatable with the plurality of clusters.

11. The computing device as recited in claim 7, wherein determining whether the extension of the plurality of clusters and the plurality of clusters are contiguously allocatable includes determining whether a benign primary directory entry component includes a contiguous allocation indicium associated with the plurality of clusters that indicates whether the plurality of clusters is currently contiguously allocated.

12. The computing device as recited in claim 7, wherein determining whether the extension of the plurality of clusters and the plurality of clusters are contiguously allocatable includes determining whether a benign secondary directory entry component includes a contiguous allocation indicium associated with the plurality of clusters that indicates whether the plurality of clusters is currently contiguously allocated.

* * * * *

UNITED STATES PATENT AND TRADEMARK OFFICE
Certificate

Patent No. 7,873,596 B2 Patented: January 18, 2011

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Ravisankar V. Pudipeddi, Bellevue, WA (US); Vishal V. Ghotge, Seattle, WA (US); Sarosh C. Havewala, Kirkland, WA (US); Ravinder S. Thind, Kirkland, WA (US); Mark J. Zbikowski, Bellevue, WA (US); and David A. Goebel, Vashon, WA (US).

Signed and Sealed this Seventeenth Day of July 2012.

Pierre M. Vital
Supervisory Patent Examiner
Art Unit 2156
Technology Center 2100